No. 838,947. PATENTED DEC. 18, 1906.
M. H. BROWNING.
SEEDER.
APPLICATION FILED AUG. 3, 1906.
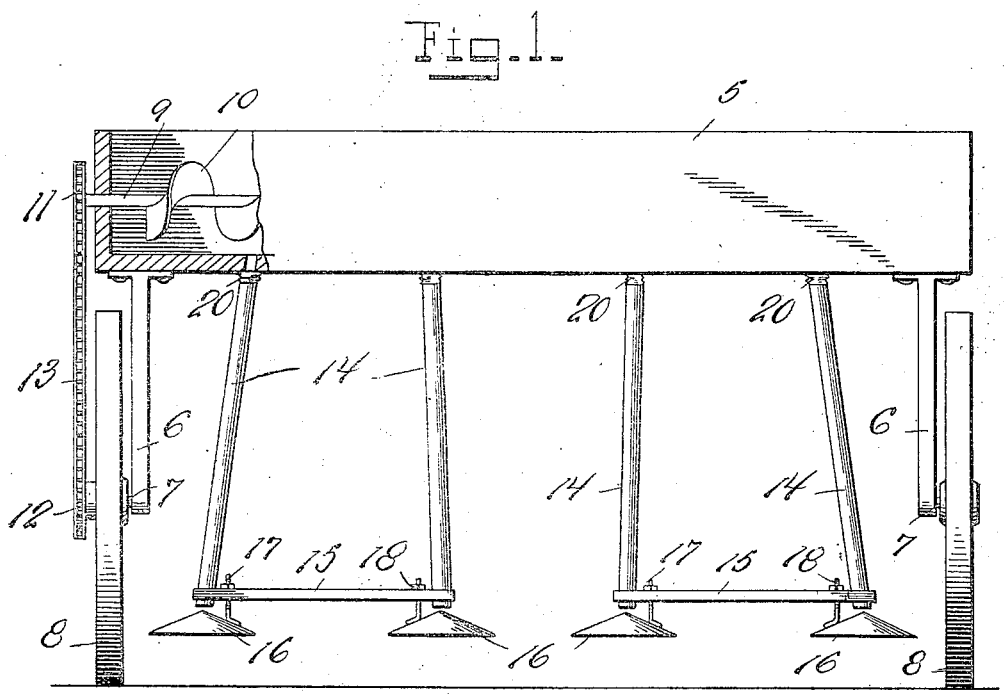
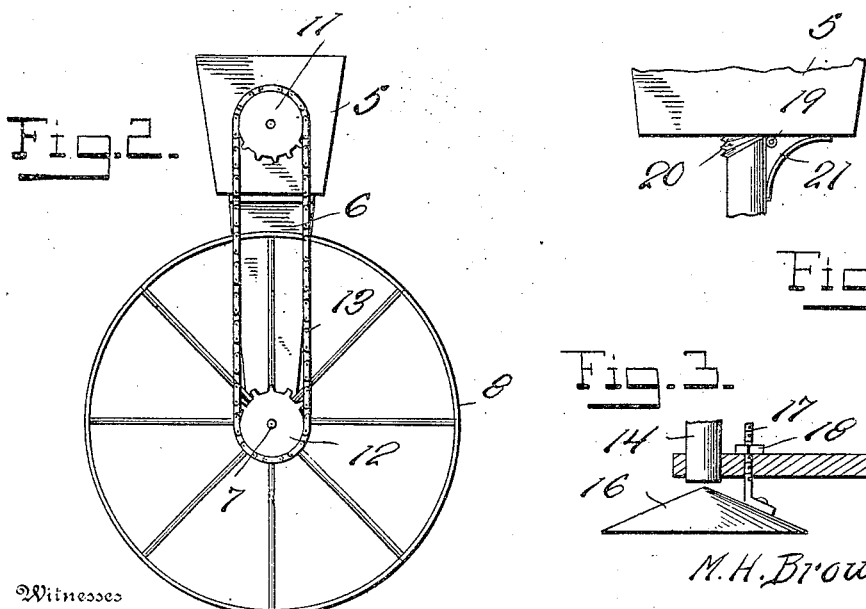
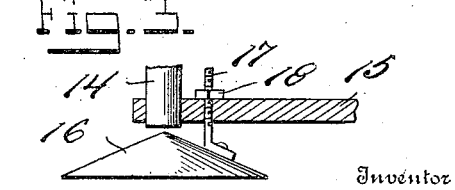

UNITED STATES PATENT OFFICE.

MELVIN H. BROWNING, OF PERRY, ILLINOIS.

SEEDER.

No. 838,947. Specification of Letters Patent. Patented Dec. 18, 1906.

Application filed August 3, 1906. Serial No. 329,102.

*To all whom it may concern:*

Be it known that I, MELVIN H. BROWNING, a citizen of the United States, residing at Perry, in the county of Pike, State of Illinois, have invented certain new and useful Improvements in Seeders; and I do hereby declare the following to be a full, clear, and exact description of the invention, such as will enable others skilled in the art to which it appertains to make and use the same.

This invention relates to seeders, and more particularly to broadcast seeders.

The primary object of the invention is to provide a seeder of this class which may be used to sow clover or other seed in a cornfield after the last plowing and when the cornstalks are several feet high without injury to the stalks and without scattering the seed upon the plants themselves.

With the above and other objects in view the present invention consists in the construction and arrangement of parts shown in the accompanying drawings, in which—

Figure 1 is a rear elevation, partly in section, of the seeder in use. Fig. 2 is a side elevation of the same. Fig. 3 is a detail view of the lower end of one of the seed-conveying tubes and the broadcast distributer. Fig. 4 is a detail view showing the manner of connecting the discharge-tubes with the hopper.

Referring more specifically to the drawings, the numeral 5 denotes the hopper of the seeder, from the under side of which and at each end thereof depend brackets 6, at the lower end of each of which is journaled a stub-shaft 7, carrying a wheel 8, the hopper being in this manner supported for travel.

The numeral 9 denotes a force-feed shaft carrying the usual spiral blade 10, and the said shaft projects beyond one end of the hopper and is provided at its said end with a sprocket-gear 11, with which and a similar gear 12 upon the wheel 8 at the corresponding side of the hopper is engaged a sprocket-chain 13, which serves as a means for driving the said shaft.

Pairs of seed-conveying tubes or spouts 14 are secured at their upper ends to the bottom of the hopper 5 and open therethrough, and the tubes of each pair extend downwardly from the said hopper in diverging planes and are connected at their lower ends by means of brace-rods 15. The hopper is supported at such a height that it will travel above stalks of corn three or four feet high, and the pairs of seed-conveying tubes are designed to pass between rows of corn when the seeder is driven through a field. Moreover, the lower ends of the seed-tubes are located at such a point that the seeds discharged therefrom will not be deposited upon the plants themselves, and thus wasted.

In order that the seeds may be distributed broadcast, I provide for each tube a conical disk 16, which is supported directly beneath the tube by means of a threaded stem 17, which is engaged through the cross-brace 15 and held in position by means of a nut 18.

To prevent injury to the said finger-tubes caused by the tubes striking against the other tubes, said tubes are hinged, as at 19, to the end side of the hopper 5 and are connected with the said hopper by means of bellows 20 to prevent separating of the seeds when the tubes are swung. To hold the tubes normally in a vertical position, are provided springs 21, they being connected at one of their ends to the said tubes and at their opposite ends to the under side of the hopper 5 adjacent its forward edge.

What is claimed is—

1. A planter comprising a hopper mounted for travel, pairs of tubes leading from the bottom of the hopper, a cross-brace connecting the tubes of each pair, and distributer elements supported beneath the lower ends of the tubes and from the said cross-braces.

2. A planter comprising a hopper mounted for travel, pairs of tubes extending downward from the hopper, cross-braces connecting the tubes of each pair, and conical distributers supported by the cross-braces beneath the discharge ends of the tubes.

3. A planter comprising a hopper mounted for travel, pairs of tubes leading from the hopper, cross-braces connecting the tubes of each pair, and inclined deflector members supported by the cross-braces beneath the discharge ends of the tube.

4. A planter comprising a hopper mounted for travel, pairs of tubes leading from the hopper, cross-braces connecting the tubes of each pair, conical deflector-plates, and stems carried by the plates and connected with the cross-braces for supporting the plates beneath the discharge ends of the tubes.

5. A planter comprising a hopper mounted for travel, distributer-tubes hinged at their upper ends to the bottom of the hopper, said hopper being provided with openings for the discharge of seed into the tube, and flexible connections between the said upper ends of the tubes and the bottom of the hopper.

6. A planter comprising a hopper mounted for travel, distributer-tubes hinged at their upper rear edges to the bottom of the hopper, and flexible connections between the unhinged portion of the said upper edge of the tubes and the bottom of the hopper.

In testimony whereof I affix my signature in presence of two witnesses.

MELVIN H. BROWNING.

Witnesses:
J. H. SMITH,
RAY ALLEN.